No. 764,446. PATENTED JULY 5, 1904.
J. FRAISER.
ACETYLENE GAS GENERATOR.
APPLICATION FILED MAR. 14, 1903.
NO MODEL.
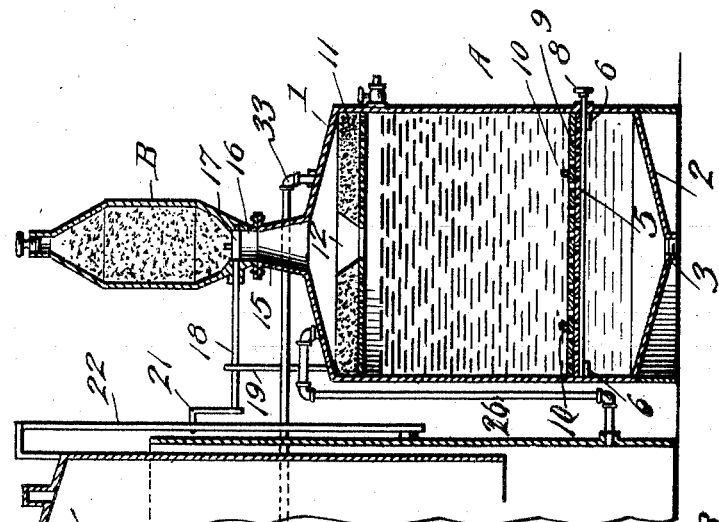
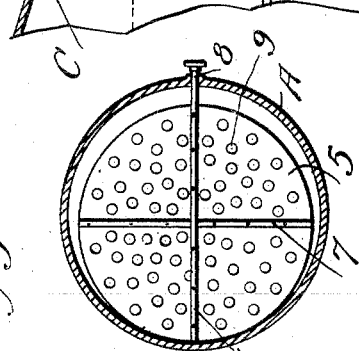
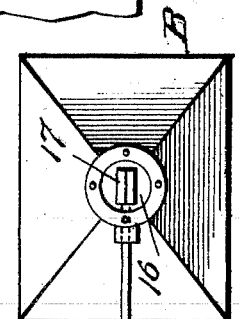
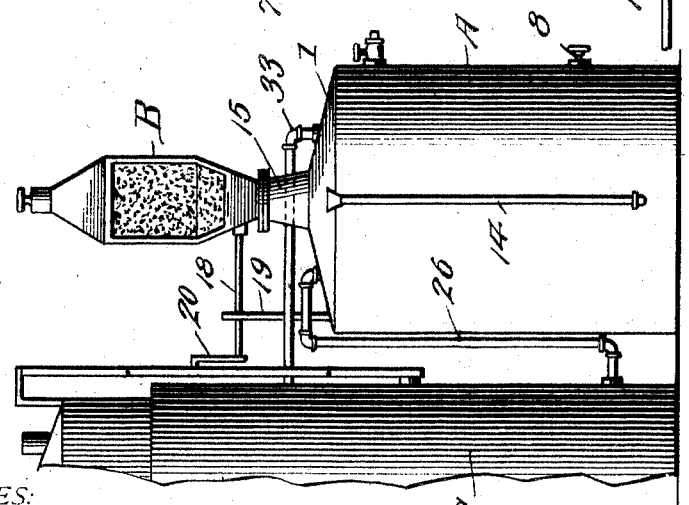
WITNESSES:
Geo. Ackman Jr.
Chas. S. Hyer
INVENTOR
John Fraiser,
BY
Victor J. Evans,
Attorney No. 764,446.

Patented July 5, 1904.

UNITED STATES PATENT OFFICE.

JOHN FRAISER, OF COLUMBIA, VIRGINIA.

ACETYLENE-GAS GENERATOR.

SPECIFICATION forming part of Letters Patent No. 764,446, dated July 5, 1904.

Application filed March 14, 1903. Serial No. 147,814. (No model.)

*To all whom it may concern:*

Be it known that I, JOHN FRAISER, a citizen of the United States, residing at Columbia, in the county of Fluvanna and State of Virginia, have invented new and useful Improvements in Gas-Generators, of which the following is a specification.

My invention has relation to improvements in acetylene-gas generating apparatus; and the object is to provide an improved apparatus of the kind named and for the purposes intended which is of simplified construction.

I have fully and clearly illustrated the invention in the accompanying drawings, to be taken as a part of this specification, and wherein—

Figure 1 is a side elevation of a part of a gasometer and the improved generator. Fig. 2 is a transverse vertical section through the generator. Fig. 3 is a bottom plan view of the strainer located in the generator and showing the body of the latter in horizontal section. Fig. 4 is a top plan view of the generator with the carbid-holder removed.

Referring to the drawings, wherein similar reference designations point out similar parts appearing in the respective illustrations, A is the generator-casing, consisting of a metal cylindrical body provided with a conical top 1 and conical bottom 2, provided with a central opening 3, through which refuse of carbid with the water may be drawn off or removed. The opening 3 is closed by a suitable removable plug 4, as shown. In the lower portion of the generator is arranged a perforated plate 5, mounted on an interior annular flange 6. The plate 5 is made of smaller diameter than the casing and is strengthened and braced by diametrically-arranged rods 7, secured thereto, one of the rods being extended slidingly through the casing, as at 8, and provided with a handle or knob, so that the plate may be reciprocated as a shaker or to open and close the openings of the plate 9, arranged upon it. The plate 9 is snugly fitted in the casing and is provided with perforations adapted to be closed and opened by the movement of the plate 5. The plate 9 is formed with guide-slots, through which vertical studs 10 on the plate 5 project to keep the plates in operative relation. These plates serve the purpose of straining the hydrate. At the upper end portion of the generator-casing is disposed a perforated plate 11, having a central funnel 12, projecting therefrom, through which the carbid passes into the generator below. On the perforated plate 11 is posited a suitable filtering substance 13, consisting of charcoal and excelsior, through which the gas rises and is strained and cleaned. Water is supplied to the generator through a suitable feed-pipe 14, as seen in Fig. 1 of the drawings. The generator is provided with a tapering neck-piece 15, formed with an annular flange around its upper end, to which the carbid-holder is secured and by which it is supported.

B designates the carbid-holder, consisting of a cylindrical body portion having conical ends and of such capacity to suit the charges to be deposited therein. The upper end of the carbid-holder is provided with a feed-opening and a detachable closure therein, substantially as seen in the drawings. The body of the holder may be partly made of glass, so as to afford visual inspection of the supply of carbid therein. The bottom of the holder is provided with a central discharge-opening 16 and on its lower end is formed with an annular flange which seats on the annular flange of the neck-piece of the generator and is secured thereto. In the discharge-opening 16 is pivotally mounted a rotatable valve 17, which also constitutes a stirrer. One of the journals of the valve is extended outside of the holder, as at 18, the extension being supported in a vertical rod 19, mounted and secured on the top of the generator. To the outer end of the extension or rod 18 is an arm 20, the free end of which is bent at right angles to the arm, as at 21, and engages in a slot in a depending rod 22, hanging from a support 23, mounted on the roof of the bell of the gasometer C, as shown in the drawings. The disposition and the arrangement of the arm 20 and the guide-bar 22 are such that the arm stands in inclined position, so that at the limits of the slot in the depending bar the rod 18 will be turned on its axis and actuate the valve, closing it when the lower end of the slot is reached and opening when the upper end of the slot depresses the arm. The top of the generator is also connected to the gasometer by a blow-off pipe 33, extending horizontally into the gasometer.

In operation the generator is supplied with the necessary quantity of water and the carbid-holder is charged with carbid, which finds its way down to the generator, with the usual result. The coacting plates in the generator may be closed at this time or they may be moved to permit the descent of the carbid through the openings. The gas generated naturally rises, a part passing through the filter and a part through the opening 12 and escapes through a suitable pipe 26, connected to the top of the generator and to the lower portion of the gasometer.

Having thus described my invention, what I claim is—

1. In an acetylene-gas apparatus, the combination with the gasometer, and a carbid-holder, of a generator comprising a cylindrical shell, and perforated straining-plates in the lower portion of the shell, and means to adjust the plates to open and close the perforations.

2. In an acetylene-gas apparatus, the combination with the gasometer and a carbid-holder, of a generator comprising a cylindrical shell, a perforated plate in the lower portion of the shell having a limited movement transversely to the axis of the shell, a fixed perforated plate on the movable plate, and means to reciprocate the movable plate to open and close the perforations.

3. In an acetylene-gas apparatus, a generator having upper and lower conical ends, fixed and movable perforated plates disposed in the lower portion of the generator, means to move the movable plate to open and close the perforations, a perforated plate in the upper portion of the generator, a filtering material disposed on the plate, and a carbid-holder to feed the carbid to the generator.

In testimony whereof I affix my signature in presence of two witnesses.

JOHN FRAISER.

Witnesses:
CHAS. S. HYER,
SADIE E. STANFORD.